May 17, 1955  J. G. CAPSTAFF  2,708,388
ILLUMINATING SYSTEMS FOR PICTURE PROJECTORS AND PRINTERS
Filed July 19, 1952  3 Sheets-Sheet 2
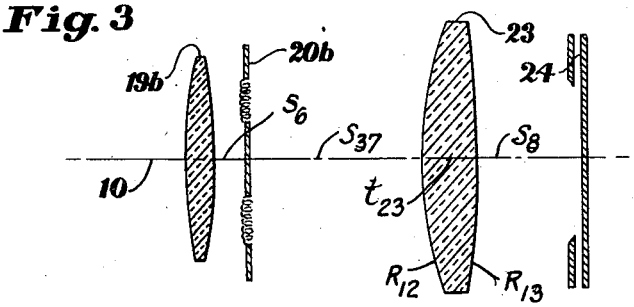
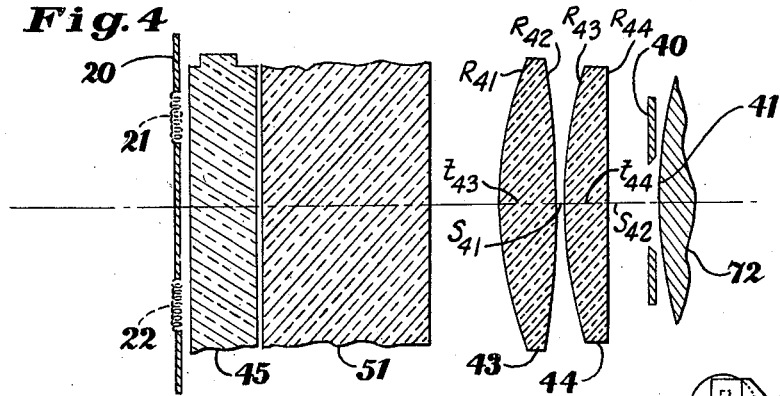
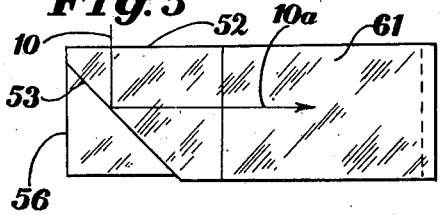
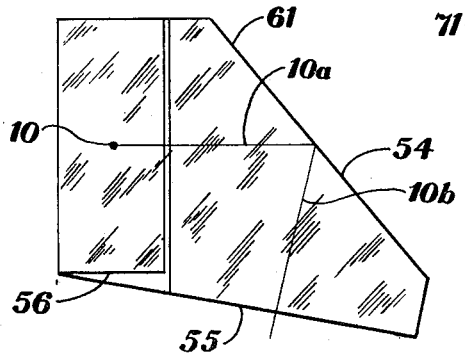
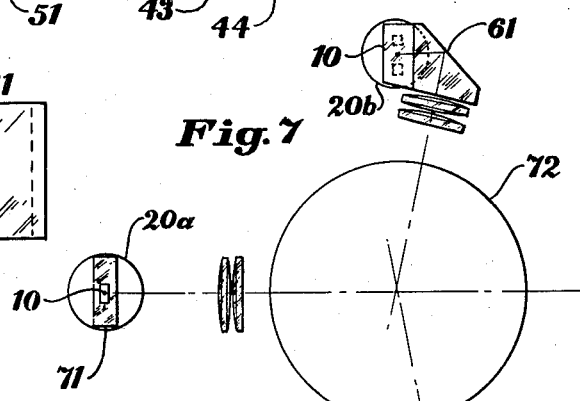
John G. Capstaff
INVENTOR.
BY Daniel I. Mayne
Harold F. Bennett
ATT'Y & AG'T May 17, 1955 J. G. CAPSTAFF 2,708,388
ILLUMINATING SYSTEMS FOR PICTURE PROJECTORS AND PRINTERS
Filed July 19, 1952 3 Sheets-Sheet 3

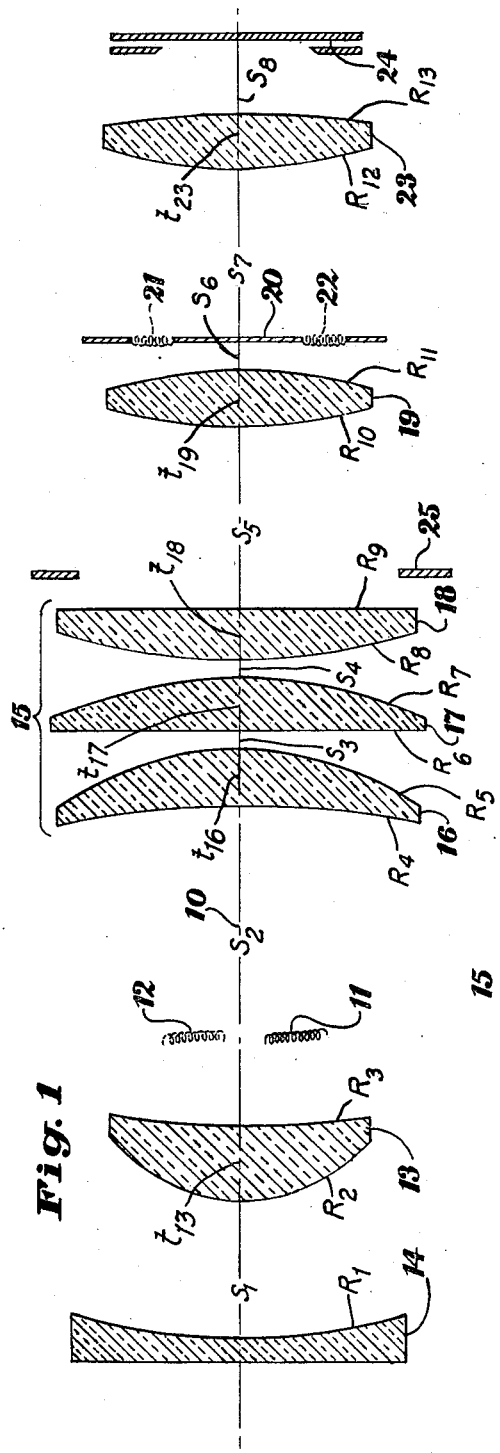
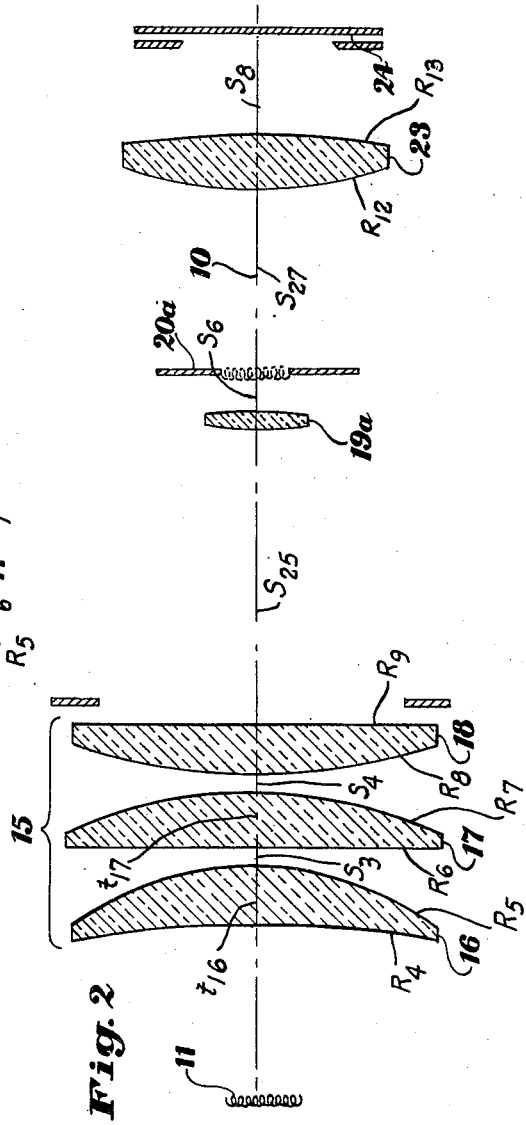

John G. Capstaff
INVENTOR.
BY
ATTY & AGT.

United States Patent Office 2,708,388
Patented May 17, 1955

2,708,388

ILLUMINATING SYSTEMS FOR PICTURE PROJECTORS AND PRINTERS

John G. Capstaff, Rochester, N. Y., assignor to Eastman Kodak Company, Rochester, N. Y., a corporation of New Jersey Application July 19, 1952, Serial No. 299,884

4 Claims. (Cl. 88—24)

This invention relates to printers for lenticular color film and particularly to illuminating systems for such printers.

The object of the invention is to provide a highly efficient and relatively inexpensive illuminating system for lenticular color film printers broadly of the type shown in U. S. Patent Nos. 1,968,145, Heymer, and 2,525,522, Capstaff. The first of these patents shows the principles of lenticular color printing using a 3-banded color filter. The same principles apply, with obvious adaptations, to color printers using the 5-banded filters which are shown in the latter patent and which have been found to be more satisfactory in practice. The first of these patents shows a flat gate type of printer, and the second shows a rotary printer.

Briefly, the lenticular color process is as follows: A film is provided, the back surface of which is coated with a photographic emulsion and the front surface of which is goffered with small cylindrical lenticules very close together and theoretically curved with such a curvature that the focal point is in the emulsion plane. In a simple form of lenticular color photography a picture is taken through a taking lens which is provided with a banded color filter in front of the objective, and the lenticules on the film separate the colored images into different strips in the emulsion. Then the film is developed and the image reversed. It is then projected using a lens provided with a similar filter so that the images taken through the separate color bands are given their respective colors by the projection filter through which they pass.

A different problem arises when a number of copies of the same film are to be made. In this case it has been found generally preferable to make three color-separation negatives on three master films. Then, to make a copy, each color-separation image is printed on the lenticular film using illumination which comes through a window or windows corresponding in position to the band or bands of the corresponding color of the color filter. It may be noted that this light is not necessarily colored and preferably is white light at this stage. Most conveniently, the three color separation images are successively printed onto the lenticular film rather than simultaneously. The copy which is thus made has no color in itself but when it is projected through a projection lens having a banded color filter with the arrangement of bands to which the printing light was made to correspond, then the projected image is given the color of the original scene.

In the particular form of the printing process to which the present invention is particularly adapted, the red band is a single band at the center of the color filter flanked by two green bands adjacent thereto and by two blue bands at the outer edge, the individual green and blue bands being approximately one-half the width of the red band. In the method of printing which has been found to be most practical, the raw lenticular film is passed successively through three film gates at which the red, green and blue master films are printed onto the raw film by suitably directed light, as above described. In this method separate illumination systems preferably are provided for the respective color band positions.

According to one form of the present invention an illuminating system for a lenticular color film printer is provided comprising an incandescent lamp of the type having a single coiled filament, a catadioptric unit behind the lamp, a plural-element condenser in front of the lamp, an opaque shield having a pair of transparent openings hereinafter referred to as windows corresponding in position to a pair of color bands in the projection filter, this shield being spaced in front of the condenser, a condenser relay lens near the shield, a film gate spaced in front of the shield and a collimating lens between the film gate and the shield and close to the film gate. This illuminating system is easily adjusted to give highly efficient illumination through the windows and is adaptable either to the flat gate type of printer or the rotary type of printer shown in the two patents previously referred to.

The lamp filament is positioned below the optical axis and the catadioptric unit forms an image of the filament above the axis of the optical system. The filament and this image thereof form twin sources, and the condenser is arranged to focus these twin sources in the pair of windows of the shield, due allowance being made for the effect of the relay lens adjacent to the shield. The relay lens has a focal length such that it is adapted to focus the condenser aperture approximately at the film gate. It is advantageous to have a rectangular aperture plate at the condenser in the plane conjugate to the film gate. Finally, the collimating lens next to the film gate is of a focal length adapted to make the windows appear at the same virtual distance and separation when viewed from the film gate as do the corresponding color bands in the projector through which the film is adapted to be projected.

In the specific embodiment of the invention disclosed herein, the catadioptric unit behind the lamp filament consists of a single positive lens element near the filament and a concave spherical mirror spaced therebehind at a distance equal to about two-thirds the radius of curvature of the mirror. The radius of curvature of the mirror is preferably between 10 and 18 times the semi-field, that is, 10 to 18 times the distance from the optical axis to the farther end of that portion of the coiled filament which is to be imaged onto the windows corresponding to the outermost pair of color bands, i. e., the blue. The dioptric power of the lens element is between 0.9 and 1.4 times that of the mirror, and the shape of the lens element is such that the surface facing the lamp has a radius of curvature greater than 10 times that of the other surface. The side facing the lamp may be either concave or convex or plane, but preferably is slightly concave. This lens element is placed as near the lamp filament as is practical in view of the diameter of the lamp bulb, about 19 mm. therefrom in the case of projection lamps currently available on the market. When finally adjusting the instrument for use, the reflecting unit is adjusted as a whole or the mirror alone is adjusted to focus the image of the filament coil into the same plane with the filament itself. It is interesting to note that the power of the catadioptric unit as computed by standard optical methods is equal to $(2 - \frac{2}{3}P_L - \frac{4}{9}P_L^2)$ where $P_L$ is the power of the lens, the radius of curvature of the mirror is unity, the power of the mirror is 2, and the optical separation of the lens and mirror is $\frac{2}{3}$, and that this power is actually negative even though each of the two components of the unit has positive power. This is because the two components are separated by more than the focal length of each. However, the focal length is not the important characteristic of this part of the optical system, since it is to be used only at unit magnification.

I have discovered that catadioptric units having the above-described structure are compact in size and produce a clear sharp filament image lying much flatter in the plane of the original filament than the image produced by the simple spherical mirror customarily used and also that they direct much more light in the useful direction than does a simple mirror of roughly the same diameter.

The condenser in front of the lamp comprises a plurality of positive elements, preferably three although two or four may be used. The shapes of the elements follow the usual rule—that is, the shapes change progressively from the element nearest the lamp, which is convex on the side away from the lamp, to the element farthest from the lamp, which is convex on the side toward the lamp and preferably substantially flat on the side away from the lamp.

In practice, when using the above-described form of the invention, the edges of the windows should not coincide with the edges of the filament image lest slight mechanical vibrations should cause undesirable variations in brightness when one edge of the filament is partly occluded by the shield and at the same time a dark area appears at the other edge of the window. Preferably the window is slightly wider than the filament image. Preferably also the window is shorter than the filament image so that only the hottest central portion of the filament is used.

According to another form of the invention, a sheet of lenticular film base is mounted transversely of the beam of light at an adjustable distance in front of the shield and oriented with its lenticules parallel to the bisector of the common center line of the two windows. This renders the adjustment of the optical system much less critical since the edges of the filament images are diffused. Also, the lenticular film operates in a highly satisfactory manner by itself as a means of dividing the light between the two windows without the use of the reflecting unit for "twinning" the filament, and the system is much less expensive to construct. The position of the lenticular light-divider is adjusted in each of the twin window beams (i. e., in the "blue" and "green" beams) to give good illumination for the particular separation between the two windows.

Theoretically, the lenticular sheet should have prismatic lenticules to direct a maximum percentage of the light to the slits. However, a sheet of lenticular film base was conveniently at hand and was tried in the system and found to work satisfactorily, even though it merely "smeared" or stretched the image along the shield so that a part of the light passed through each slit. By adjusting the position of this lenticular light divider along the axis an optimum position was found for the "green" slits and an optimum position closer to the lamp for the "blue" slits. Actually, under microscopic examination, the lenticules are found to be of somewhat irregular shape and rather more flattened on their crowns than perfect cylindrical lenticules.

According to still another form of the invention, the light is divided between the two windows in the "blue" and "green" beams by a pair of wedge prisms placed vertex to vertex in place of or in addition to the sheet of lenticular film base and in substantially the same position.

Due to the necessity of mounting the lamp with its base down, suitable reflecting prisms, which are hereinafter described, are provided for redirecting the light beam when any of the forms of the invention is adapted for use with a rotary printer.

In the accompanying drawings:

Fig. 1 shows an illuminating system according to one form of the invention for illuminating the windows corresponding to the blue filter bands.

Fig. 2 shows a modification of the system for illuminating the central window corresponding to the red band.

Fig. 3 shows a part of the system of Fig. 1 as modified to illuminate the windows corresponding to the green bands.

Fig. 4 shows a part of the system of Fig. 1 modified for use in a rotary printer.

Figs. 5 and 6 shows in detail the prism indicated in Fig. 4.

Fig. 7 shows a convenient arrangement of the gates around the sprocket wheel of a rotary printer.

Figs. 1 to 4, 8 and 9 are diagrammatic axial sections of lens systems in which some distances and thicknesses are exaggerated relative to others.

Figure 8:
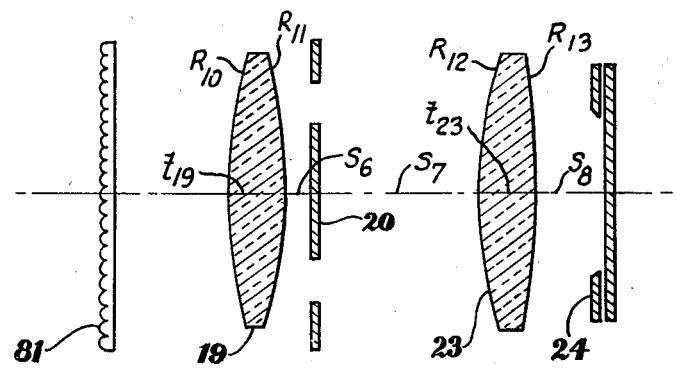
Figs. 8 and 9 show features of illuminating systems according to other forms of the invention.

In Fig. 1 the lamp filament 11 is located somewhat below the optical axis 10 of the lens system and a catadioptric unit 13, 14 forms an image 12 of the lamp filament in a symmetrical position on the opposite side of the axis 10. The lamp filament 11 and its image 12 then act as twin sources of light and are imaged by the condenser system 15 comprising three elements 16, 17, 18 into the twin windows 21, 22 of the mask 20, corresponding to the blue bands of the filter. A relay lens 19 forms an image of the condenser 15 on the film gate 24 and a collimating lens 23 arranged in front of the film gate and close to it is analogous to the projection lens shown in Fig. 1 of the Heymer patent and forms a virtual image of the windows 21, 22 at a distance corresponding to the virtual image of the banded color filter formed by the projection lens for which the film is intended. Preferably, an aperture mask 25 is placed next to the condenser 15 corresponding in shape to the film gate—that is, rectangular—and this mask is focused on the film gate by the relay lens 19.

Specifications for a particular lens system as shown in Fig. 1 are given in the Table I. The focal length is not specified. The dimensions are the actual dimensions of a system used in printing 35 mm. film.

*Table I*

| Element | N | Radii, mm. | Thickness, mm. | Spacings, mm. |
|---|---|---|---|---|
| 14 | | $R_1 = +155.4$ | | $S_1 = 101.4$ |
| 13 | 1.523 | $R_2 = + 33.2$ | $t_{13} = 15.0$ | |
| | | $R_3 = +979.3$ | | $S_2 = 93.4$ |
| 16 | 1.523 | $R_4 = -234.8$ | $t_{16} = 11.0$ | |
| | | $R_5 = - 62.1$ | | $S_3 = 4.0$ |
| 17 | 1.523 | $R_6 = \infty$ | $t_{17} = 10.0$ | |
| | | $R_7 = - 92.6$ | | $S_4 = 4.0$ |
| 18 | 1.523 | $R_8 = +129.6$ | $t_{18} = 10.0$ | |
| | | $R_9 = \infty$ | | $S_5 = 178.8$ |
| 19 | 1.523 | $R_{10} = +100.9$ | $t_{19} = 11.0$ | |
| | | $R_{11} = -100.0$ | | $S_6 = 7.0$ |
| 20 | (Shield) | | | $S_7 = 75.4$ |
| 23 | 1.523 | $R_{12} = + 90.0$ | $t_{23} = 11.0$ | |
| | | $R_{13} = -227.0$ | | $S_8 = 50.0$ |
| 24 | (Film plane) | | | |

In this table the optical elements are numbered in the first column corresponding to the numbering in Fig. 1 from the mirror 14 to the film gate 24. The refractive index N of the lens elements is given in the second column. The radii of curvature of the optical surfaces are given in the third column, the plus and minus signs associated therewith indicating surfaces which are concave and convex respectively toward the film gate 24. In the case of the lens elements, the radius of curvature of the side facing the mirror is given opposite the number of the element and the radius of the other surface is given in the next line below in the table. The last two columns give the thicknesses of the lens elements and the spacings between each optical element and the next. It may be noted that the distance from the lamp filament to the first condenser lens is about 74.4 mm. This distance, of course, is to be adjusted so as to get the best focus of the filament image in the windows.

Fig. 2 shows the system of Fig. 1 modified for illuminating the central window of the shield corresponding to the red band of the projection filter. In this case the lamp filament is centered on the axis and the reflector unit is omitted. With the filament centered, the reflector would only image the filament back on itself anyway, and ample intensity of illumination is produced without the reflector to balance the three systems. Also, the relay lens 19a is preferably substituted for relay lens 19 of Fig. 1. Relay lens 19a is an equiconvex lens element with the radius of curvature of each surface equal to 97 mm., and its thickness is 3.2 mm. The shield 20a is positioned at a distance $S_{27}$ equal to 75.4 mm. from the collimating lens 23 and the condenser 15 is positioned with its front element 18 at a distance of 181.6 mm. from the relay lens 19a. The lens elements 16, 17, 18, and 23 are exactly the same as in Fig. 1. I have found that the best focus of the lamp filament is 2 or 3 mm. farther away from the condenser than in the case of the system of Fig. 1.

Fig. 3 shows part of Fig. 1 modified for illuminating the shield 20b having windows corresponding to the green filter bands. In this case the shield 20b is positioned at a distance $S_{37}$ equal to 75 mm. from the collimating lens 23, the relay lens 19b is an equiconvex element, each surface of which has a radius of curvature of 99 mm. and the thickness of which is 6 mm. The distance of this element from the condenser is 182.4 mm. It has been found by trials that the best position for the lamp filament is about 1½ mm. farther away from the condenser than in the system of Fig. 1.

Fig. 4 shows part of the system of Fig. 1 modified for use in a rotary printer operating on the same general principles as those described in my earlier patent mentioned above. Only the part of the system from the masking aperture plate 20 to the film 41 and sprocket wheel 72 is shown. The rest of the system is the same as shown in Fig. 1 except for slight adjustments in the spaces between members as follows: The distance $S_5$ from the condenser element 18 to the relay lens 19 is 176.1 mm. and the distance from the lamp filament to the condenser is 74.8 mm. rather than as given in and following the table above.

In the flat gate printer shown in Fig. 1 the light striking the film appears to come from the virtual images, not shown, of the windows 21, 22 which virtual image, in accordance with a more or less standard practice, is at a distance of about 10¾ inches from the film gate. In Fig. 4 on account of the curvature of the film 41 lying on the sprocket wheel 72, the collimating lens must have enough dioptric power to form the virtual image of the windows at infinity or even be somewhat stronger, in which case it would form a real image positioned behind the film. By way of illustration only, if the radius of the sprocket is 10¾ inches, the image of the windows should be at infinity. Roughly speaking, the lens element 43 may be considered as having the same function as the lens element 23 in Figs. 1, 2, and 3, and the added lens element 44 may be considered as compensating for the curvature of the gate. In the example for which specific data is given below in Table II, the power is divided between these two elements approximately in accordance with this rule, but obviously the power does not need to be divided in that proportion.

A further modification is made necessary in the rotary printer because filament lamps of the type used in this system must be burned with the base down; that is, the length of the filament is in the vertical direction. The film gates, on the other hand, are distributed around the sprocket wheel, the red being horizontal at the left as shown in Fig. 7, the green being near the top and the blue being near the bottom leaving room at the right for equipment (not shown) for printing a sound track. Prisms 61, 51 are provided in the "green" and "blue" beams for receiving the light rays from the windows, reflecting them twice and directing them toward the film gate with the proper orientation. The prism is merely indicated at 51 in Fig. 4 as a parallel plate of equivalent thickness in accordance with the usual convention.

Figs. 5 and 6 show the prism 61 used for printing the image corresponding to green. The optical axis 10 enters the prism through the face 52, Fig. 5, and is reflected from the diagonal face 53 to follow the path 10a, Figs. 5 and 6, and is again reflected at the oblique face 54 to emerge through face 55 along the path 10b. The axis 10 entering the prism is indicated in Fig. 6 by a heavy dot to indicate that it enters from behind the plane of the drawing and perpendicular thereto. The opposite prism 51 (Fig. 7) corresponding to blue has the same dimensions but is left-handed with respect to the prism 61—that is, it has the shape of a mirror image thereof. The length of the optical axis in each of these prisms in a specific form of the invention which has been made up is 88.2 mm.

Fig. 7 shows in elevation the general arrangement of the optical systems in one form of rotary printer. The sprocket wheel is indicated by the circle 72. The film gates are not shown but are understood to be centered upon the three optical axes shown by the dot-dash lines which extend into the circle. The three shields 20, 20a, 20b are centered upon the respective optical axes 10 which approach from behind the plane of the drawing before being reflected by the respective prisms and which are indicated by heavy dots. The part of each optical system traversed by the light before reaching the shield is not shown in this diagram.

A sectored disk shutter (not shown) is provided behind the plane of the drawing. This disk rotates coaxially with the sprocket wheel 72 for cutting off each beam while the film is advancing to the next frame. The "red" film gate of course is directly in the horizontal line but the "green" and "blue" film gates are displaced from the vertical by about 11 degrees, and the oblique faces 54 of the prisms 51, 61 are correspondingly deviated about five degrees from the strict diagonal direction. The diameter of the sprocket wheel, the displacement of the film gate from the vertical, the deviation of the oblique prism face 54 from the diagonal and the size of the prism are mutually determined during the design of the instrument so that the three optical axes lie in the vertical and horizontal planes and so that the light beams are aimed directly at the film gates.

In order to view the filament image directly while adjusting the focus and alignment of the optical systems and particularly the position of the lamp filament and the magnification produced by the condenser, it is advantageous to provide in each optical system a 45-degree sighting prism 56 (Figs. 5 and 6) the same size as the prism 71. This auxiliary prism is cemented on to each of the three prisms 51, 61, 71, on the back of the diagonal reflecting surface after the diagonal reflecting surface is given a metallic or interference coating for reflecting about 98 or 99 percent of the light and transmitting about one percent. An operator may then look into the optical system through the back face of prism 56 while adjusting the instrument.

In Fig. 4 the prism 51 is shown merely as a parallel plate of glass, the actual thickness of which 88.2 mm., equal to the path length of the light in the actual prism 51 shown in Figs. 5 and 6, as is customary in optical diagrams. An additional thickness of glass is provided either in the form of a flat plate 45 or an additional thickness of the prism 51, the optical effect being the same in either case, for the purpose of adjusting the optical systems in an axial direction so that the shields 20, 20a and 20b all lie in substantially the same plane and so that the revolving sector disk shutter not shown can cut all the beams of light at substantially the same relative point near the shields.

Table II below gives data for specific embodiment of the lens elements shown in Fig. 4 in the same manner as data was given in Table I. This part of the system is the same for all three printing beams. In the system corresponding to the blue, the distance between the element 43 and the shield 20 is made up of 39 mm. of air and 114 mm. in glass. In the optical system corresponding to the green, this distance is made up of 42.4 mm. of air and 110.6 of glass. In this system corresponding to the red, this distance is made up of 102.2 mm. of air and 20 mm. of glass.

*Table II*

| Elements | N | Radii, mm. | Thicknesses, mm. | Spacing, mm. |
|---|---|---|---|---|
| 43 | 1.523 | $R_{41}=+\ 76.8$ | $t_{43}=11.0$ | |
| | | $R_{42}=-327.7$ | | $S_{41}=1.5$ |
| 44 | 1.523 | $R_{43}=+103.6$ | $t_{44}=9.0$ | |
| | | $R_{44}=\infty$ | | $S_{42}=24.1$ |

Fig. 8 shows a part of an illumination system according to another form of the invention, the essential feature of which is a sheet of lenticular film base 81 inserted to spread the light to the two windows. The rest of the system, not shown in Fig. 8, is or may be like the corresponding portion of Fig. 1 or Fig. 2. In the latter case, an ordinary concave spherical mirror may be mounted behind the lamp if desired. The lenticular light spreader is adjusted to a distance from the relay lens which gives good illumination through the windows corresponding to blue (as shown) or to green (not shown) as the case may be.

Figure 9:
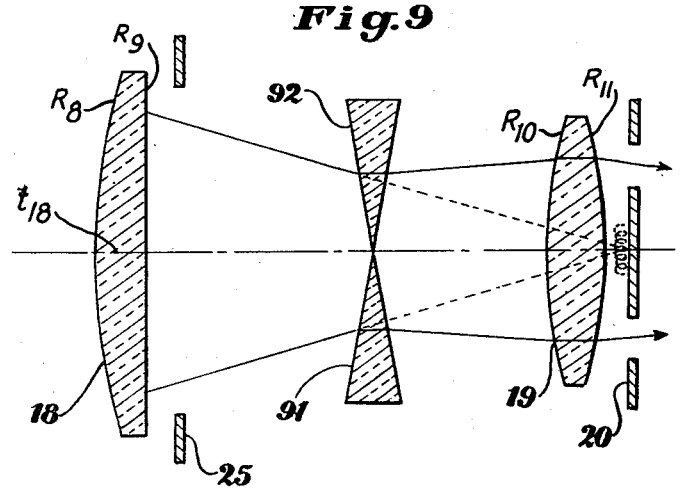

Fig. 9 shows part of an illumination system according to still another form of the invention. In this system a pair of deviation prisms 91, 92 are used rather than the piece of lenticular film base for dividing the light between the two windows. This system requires more careful adjustment than the system of Fig. 8, but gives a higher level of illumination when well adjusted.

It has been found that best results are obtained if the width of the windows 21, 22 is somewhat greater than the width of the filament image, so that slight mechanical vibrations of the filament itself do not cause an edge of the filament image to be cut off by the edge of the window. If that should happen, undesirable unevenness in the brightness at the film would occur. This ample window width is important also because filaments differ slightly from lamp to lamp and because they usually change shape as they age. Also, the filament should be positioned so that only light from the central part along the length of the filament passes through the windows.

In the specific embodiment of the invention shown in Fig. 1, the reflecting system consists of a concave spherical mirror having a radius of curvature about 15 times the semi-field to be covered. The semi-field covered by the reflecting system is the greatest in the system corresponding to the blue. In this case the central portion of the filament, the portion which is actually used, extends from a point 7.0 mm. from the axis to a point 10.8 mm. from the axis so that the semi-field is 10.8 mm., but it may be slightly more or less according to the exact final adjustment of the instrument. The dioptic power of the mirror of course is twice the reciprocal of the radius or 12.9 diopters. The dioptic power of the lens element is 15.3 diopters computed by standard optical equations. This is obviously between 9.9 and 1.4 times the power of the mirror. Thus this reflecting unit is made in accordance with these features of the invention as described above. The radius of curvature of the front surface of the lens facing the lamp filament is 29 times the radius of curvature of the rear surface. This is greater than 10 times in accordance with another feature of the invention. The condenser consists of three lens elements, the front two of which are plano convex with the convex sides facing each other and the rear one of which is meniscus in shape concave to the lamp. I find that more uniform illumination is obtained with his condenser than with the customary two-element condenser.

In order to obtain equal intensity between the beams coming through the two windows 21, 22 of Fig. 1, a neutral gray filter (not shown) is optionally placed in the path of the beam passing through the upper window 21. The density of this neutral filter is such as to transmit between 70 percent and 90 percent of the incident light. The exact density required is easily determined by photoelectric measurements of the two beams.

All the lens elements in the system and also the prisms are made of common white optical crown glass with a refractive index of 1.523 and a dispersive index of 58.6. The use of this particular glass is not essential to the working of the system but it is readily available in commercial quantities and with a high degree of uniformity.

Optionally, a sheet of lenticular film base as shown at 81, Fig. 8, is added to the systems shown in Figs. 1 and 3, as previously mentioned, and is positioned between lens elements 18 and 19 or 19b. Also, if a simpler system is desired and if illumination requirements are not so high, all three systems may be made up with the lamp filament on the axis and with the lenticular sheet used in the "green" and "blue" systems to divide the light between the two windows as previously explained.

It will be noted that all the systems for the "green" and "blue" beams, that is, for twin window illumination, are characterized by having optical means for dividing the light between the two windows and directing it through the windows so that it fills the film gate, and that the system for illuminating the single window is matched to the other systems by omitting the reflector behind the lamp or optionally by using a lower wattage lamp or by a neutral filter in the beam so that the intensity at the film gate is substantially the same. The light dividing means is either a reflector arranged with the lamp filament off-axis for forming twin light beams, a lenticular sheet or twin prism means as described.

I claim:

1. In a photographic three-color printer for printing lenticular film for projection through a projection objective provided with a symmetrical five-banded color filter in front of the objective and said printer being provided with three film gates and means for passing film through the film gates, three balanced illuminating systems individually associated with the film gates and each comprising a collimating lens coaxial with and immediately in front of the film gate, an opaque shield perpendicular to the axis in front of the collimator lens and provided with at least one transparent opening hereinafter designated as a window, a plural-component condenser lens spaced in front of the shield, a relay lens adjacent to the opaque shield for imaging the condenser lens substantially at the film gate, and a light source of long narrow shape in the vicinity of the axis and positioned so that it is imaged by the condenser substantially in the plane of the shield, the shield in one of the three systems having a single rectangular window centered upon the axis and corresponding to the central band of the color filter, the shields in the other two systems each having two rectangular windows symmetrical to the axis and each corresponding to one of the symmetrical pairs of bands of the color filter, each of the latter two systems having the light source located below the axis and having a reflecting system consisting of a positive lens element and a concave spherical reflector for forming a sharp image of the light source above the axis to act with the original light source as twin light sources cooperating with the previously recited members of the optical system, for directing light through the respective windows to the film gate, and the dimensions and position of the shields and the focal lengths of the collimating lenses being such that each collimating lens forms a virtual image of the window or windows in the associated shield, said virtual image corresponding in position to the apparent position of a pair of the color bands in front of the projection objective.

2. In a photographic printer for printing lenticular film for projection through a projection objective provided with a symmetrically banded color filter in front of the objective, an illuminating system having an optical axis and comprising a light source of long narrow shape displaced lengthwise from the axis, a reflecting unit behind the light source for forming an image of the light source symmetrical thereto on the opposite side of the axis, an opaque shield spaced in front of the light source and provided with a pair of rectangular windows symmetrically arranged with respect to the axis, a plural component condenser axially aligned between the light source and the opaque shield and adapted to form a pair of images of the light source and its symmetrical image at the pair of windows, a film gate spaced in front of the opaque shield, a collimating lens near the film gate for forming a virtual image of the pair of windows corresponding in position to the apparent position of a pair of the color bands in front of the projection objective, and a relay lens element adjacent to the opaque shield for imaging the condenser lens substantially at the film gate, in which the reflecting unit consists of a positive lens element near the light source and a concave substantially spherical mirror spaced therebehind.

3. In an illuminating system for a lenticular film printer, a catadioptric unit symmetrical around an axis and adapted to receive light from a light source disposed to one side of the axis and and to form an image thereof on the opposite side of the axis, substantially at unit magnification and substantially in the same transverse plane, said catadioptric unit comprising a concave spherical mirror which has a focal length between 5 and 9 times the distance from the axis to the farthest usable point of the light source and a single positive lens elemen betwen the mirror and the light source and spaced from the mirror by about four-thirds the said focal length of the mirror, in which the dioptric power of the lens element is between 0.9 and 1.4 times that of the mirror and the surface of the lens element facing the lamp is concave and has a radius of curvature greater than ten times that of the other surface thereof.

4. A catadioptric system symmetrical around an axis and adapted to receive light from a finite object field disposed to one side of the axis and to form an image thereof on the opposite side of the axis, substantially in the same transverse plane and substantially at unit magnification, said catadioptric system comprising a concave spherical mirror which has a focal length between 5 and 9 times the distance from the axis to the farthest point of the object field and a positive lens system between the mirror and the object field and spaced from the mirror by more than four-thirds the focal length of the latter, the dioptric power of the lens system being between 0.9 and 1.4 times that of the mirror, and the radius of curvature of the lens surface facing the object field being greater than ten times that of the lens surface facing the mirror.

References Cited in the file of this patent
UNITED STATES PATENTS

| | | |
|---|---|---|
| 1,213,974 | Taylor | Jan. 30, 1917 |
| 1,984,481 | Heymer | Dec. 18, 1934 |
| 1,985,398 | Berthon | Dec. 25, 1934 |
| 2,017,575 | Thomas | Oct. 15, 1935 |
| 2,055,237 | Leitz | Sept. 22, 1936 |
| 2,186,123 | Rantsch | Jan. 9, 1940 |
| 2,186,619 | Sauer | Jan. 9, 1940 |
| 2,189,751 | Bocca | Feb. 13, 1940 |
| 2,192,886 | Bergmans | Mar. 12, 1940 |
| 2,195,392 | Van Alphen | Mar. 26, 1940 |
| 2,229,302 | Martin et al. | Jan. 21, 1941 |